US012784480B2

(12) United States Patent
Madhumani et al.

(10) Patent No.: US 12,784,480 B2
(45) Date of Patent: Nov. 3, 2026

(54) SYSTEM AND METHOD FOR DATA ADAPTIVE SINGLE-SHOT MULTI-LABEL SEGMENTATION WITH FOUNDATION MODELS

(71) Applicant: GE Precision Healthcare LLC, Waukesha, WI (US)

(72) Inventors: Gurunath Reddy Madhumani, Bangalore (IN); Dattesh Dayanand Shanbhag, Bangalore (IN); Deepa Anand, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 284 days.

(21) Appl. No.: 18/617,067

(22) Filed: Mar. 26, 2024

(65) Prior Publication Data

US 2025/0308268 A1 Oct. 2, 2025

(51) Int. Cl.
*G06V 20/70* (2022.01)
*G06V 10/25* (2022.01)
(Continued)

(52) U.S. Cl.
CPC .............. *G06V 20/70* (2022.01); *G06V 10/26* (2022.01); *G06V 10/457* (2022.01); *G06V 10/761* (2022.01); *G06V 2201/03* (2022.01)

(58) Field of Classification Search
CPC ...... G06V 20/70; G06V 10/26; G06V 10/457; G06V 10/761; G06V 2201/03; G06V 10/267; G06V 10/25; G06V 10/82
See application file for complete search history.

(56) References Cited

U.S. PATENT DOCUMENTS

2006/0209063 A1* 9/2006 Liang ...................... G06T 7/155 345/419
2008/0267468 A1* 10/2008 Geiger ................ G01S 7/52036 382/128

(Continued)

OTHER PUBLICATIONS

Liu, Z., Zhang, H., & Zhao, C. (2023). Prototype-oriented contrastive learning for semi-supervised Medical Image Segmentation. Biomedical Signal Processing and Control, 88, 105571. https://doi.org/10.1016/j.bspc.2023.105571 (Year: 2023).*

(Continued)

*Primary Examiner* — John Villecco
*Assistant Examiner* — Kyla Guan-Ping Tiao Allen
(74) *Attorney, Agent, or Firm* — Fletcher Yoder, P.C.

(57) ABSTRACT

A method includes obtaining a medical image and receiving a selection of both a template image and a region of interest within the template image. The method includes inputting both the medical image and the template image into a trained vision transformer model and outputting from the trained vision transformer model both pixel level feature vectors from the medical image and a reference pixel level feature vector from the region of interest of the template image. The method includes inputting both the pixel level feature vectors and the reference pixel level feature vector into a trained contrastive similarity metric learning model and outputting from the trained contrastive similarity metric learning model pixel that are similar to reference pixels. The method (Continued)

includes labeling the pixels in the medical image with a segmentation mask, wherein the pixels that are labeled in the medical image correspond to the region of interest.

18 Claims, 11 Drawing Sheets

(51) Int. Cl.

| | |
|---|---|
| ***G06V 10/26*** | (2022.01) |
| ***G06V 10/44*** | (2022.01) |
| ***G06V 10/74*** | (2022.01) |
| ***G06V 10/82*** | (2022.01) |

(56) References Cited

U.S. PATENT DOCUMENTS

| | | | | |
|---|---|---|---|---|
| 2021/0334598 | A1* | 10/2021 | Tan | G06V 10/774 |
| 2022/0068498 | A1* | 3/2022 | Tizhoosh | G16H 15/00 |
| 2022/0222932 | A1* | 7/2022 | Zhang | G06N 3/045 |
| 2023/0186509 | A1* | 6/2023 | Ryan | G06V 10/774 382/103 |
| 2023/0207106 | A1* | 6/2023 | Morvan | G06T 7/136 382/100 |
| 2024/0104882 | A1* | 3/2024 | Jeong | G06V 10/255 |
| 2024/0233134 | A1* | 7/2024 | Liao | G06T 7/11 |
| 2025/0349101 | A1* | 11/2025 | Cersovsky | G06V 10/774 |

OTHER PUBLICATIONS

Butoi, et al., "UniverSeg: Universal Medical Image Segmentation," arXiv:2304.06131v1 [cs.CV] Apr. 12, 2023, https://universeg.csail.mit.edu, 35 pgs.

Mcgrath, et al., "Optimizing radiologist productivity and efficiency: Work smarter not harder," Elsevier European Journal of Radiology 155 (2022) 110131, Dec. 31, 2021, https:/doi.org/10.1016/j.ejrad.2021.110131, 9 pgs.

Oquab, et al., "DINOv2: Learning Robust Visual Features without Supervision," arXiv:2304.07193v2 [cs.CV] Feb. 2, 2024, https://openreview.net/forum?id=a68SUt6zFt, 32 pgs.

Tang, et al., "Emergent Correspondence from Image Diffusion," 37the Conference on Neural Information Processing System (NeurIPS 2023), arXiv:2306.03881v2 [cs.CV] Dec. 6, 2023 27 pgs.

Taylor-Phillips, et al., "Fatigue in radiology: a fertile area for future research," Br J Radiol 2019: 92: 20190043, Warwick Medical School, The University of Warwick, Coventry, England, 6 pgs.

U.S. Appl. No. 18/475,406, filed Sep. 27, 2023, Deepa Anand.

U.S. Appl. No. 18/491,992, filed Oct. 23, 2023, Dattesh Dayanand Shanbhag.

* cited by examiner

346

| N = 15 three plane localizer Volumes | Localization (average Accuracy) | Segmentation (mean IoU) |
|---|---|---|
| Cosine Similarity (Manual Thresholding based approach) | 51.2 | 51.5 |
| Contrastive Similarity (data adaptive approach) | 91.5 | 86.6 |

FIG. 10

SYSTEM AND METHOD FOR DATA ADAPTIVE SINGLE-SHOT MULTI-LABEL SEGMENTATION WITH FOUNDATION MODELS

BACKGROUND

The subject matter disclosed herein relates to medical imaging and, more particularly, to a system and a method for data adaptive single-shot multi-label segmentation with foundation models.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During MRI, when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, Mt. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

Localization and region interest segmentation needs are ubiquitous in different stages of a radiology workflow: planning, guidance, and lesion identification and measurement. However, localization is laborious and repetitive task. In addition, localization increases clinician fatigue which may lead to inaccuracy. Further, localization increases costs. Foundation models are attractive to automate localization needs given their excellent grounding capabilities demonstrated in natural images. However, previous attempts using grounding foundation models out of the box for radiology image localization have not been successful.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method is provided. The computer-implemented method includes obtaining, at a processor, a medical image of a portion of a subject. The computer-implemented method also includes receiving, at the processor, a selection of both a template image and a region of interest within the template image, wherein the region of interest is marked in the template image and is associated with a label. The computer-implemented method further includes inputting, via the processor, both the medical image and the template image into a trained vision transformer model. The computer-implemented method even further includes outputting, via the processor, from the trained vision transformer model both pixel level feature vectors from the medical image and a reference pixel level feature vector from the region of interest of the template image. The computer-implemented method still further includes inputting, via the processor, both the pixel level feature vectors and the reference pixel level feature vector into a trained contrastive similarity metric learning model, wherein the trained contrastive similarity metric learning model is configured to automatically determine which of the pixel level feature vectors are similar to the reference pixel level feature vector. The computer-implemented method yet further includes outputting, via the processor, from the trained contrastive similarity metric learning model pixels that are similar to reference pixels. The computer-implemented method further includes labeling, via the processor, the pixels in the medical image associated with the pixel level feature vectors that are similar to the reference pixel level feature vector with an initial segmentation mask, wherein the pixels that are labeled in the medical image correspond to the region of interest.

In another embodiment, a system for performing one-shot anatomy localization is provided. The system includes a memory encoding processor-executable routines. The system also includes a processor configured to access the memory and to execute the processor-executable routines, wherein the routines, when executed by the processor, cause the processor to perform actions. The actions include obtaining a medical image of a portion of a subject. The actions also include receiving a selection of both a template image and a region of interest within the template image, wherein the region of interest is marked in the template image and is associated with a label. The actions further include inputting both the medical image and the template image into a trained vision transformer model. The actions even further include outputting from the trained vision transformer model both pixel level feature vectors from the medical image and a reference pixel level feature vector from the region of interest of the template image. The actions still further include inputting both the pixel level feature vectors and the reference pixel level feature vector into a trained contrastive similarity metric learning model, wherein the trained contrastive similarity metric learning model is configured to automatically determine which of the pixel level feature vectors are similar to the reference pixel level feature vector. The actions yet further includes outputting from the trained contrastive similarity metric learning model pixels that are similar to reference pixels. The actions further include labeling the pixels in the medical image associated with the pixel level feature vectors that are similar to the reference pixel level feature vector with an initial segmentation mask, wherein the pixels that are labeled in the medical image correspond to the region of interest.

In a further embodiment, a non-transitory computer-readable medium is provided. The non-transitory computer-readable medium includes processor-executable code that, when executed by a processor, causes the processor to perform actions. The actions include obtaining a medical image of a portion of a subject. The actions also include receiving a selection of both a template image and a plurality of regions of interest within the template image, wherein each region of interest of the plurality of regions of interest is respectively marked in the template image and is associated with a respective label. The actions further include inputting both the medical image and the template image into a trained vision transformer model. The actions even further include outputting from the trained vision transformer model both respective pixel level feature vectors from the medical image and respective reference pixel level feature vectors from each region of interest of the plurality of regions of interest of the template image. The actions still further include inputting both the pixel level feature vectors and the respective reference pixel level feature vector into a trained contrastive similarity metric learning model, wherein the trained contrastive similarity metric learning model is configured to automatically determine which of the pixel level feature vectors are similar to each respective reference pixel level feature vector for each region of interest. The actions yet further includes outputting from the trained contrastive similarity metric learning model respective groups of pixels that are similar to each of respective reference pixels for each region of interest. The actions further include individually labeling the respective groups of pixels in the medical image associated with each group of the respective groups of pixel level feature vectors that are similar to each respective reference pixel level feature vector for each region of interest with a respective initial segmentation mask, wherein the respective groups of pixels that are individually labeled in the medical image correspond to respective regions of interest of the plurality of regions of interest.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 10 depicts a table comparing region of interest localization and shoulder segmentation utilizing different approaches, in accordance with aspects of the present disclosure.

DETAILED DESCRIPTION

Figure 1:
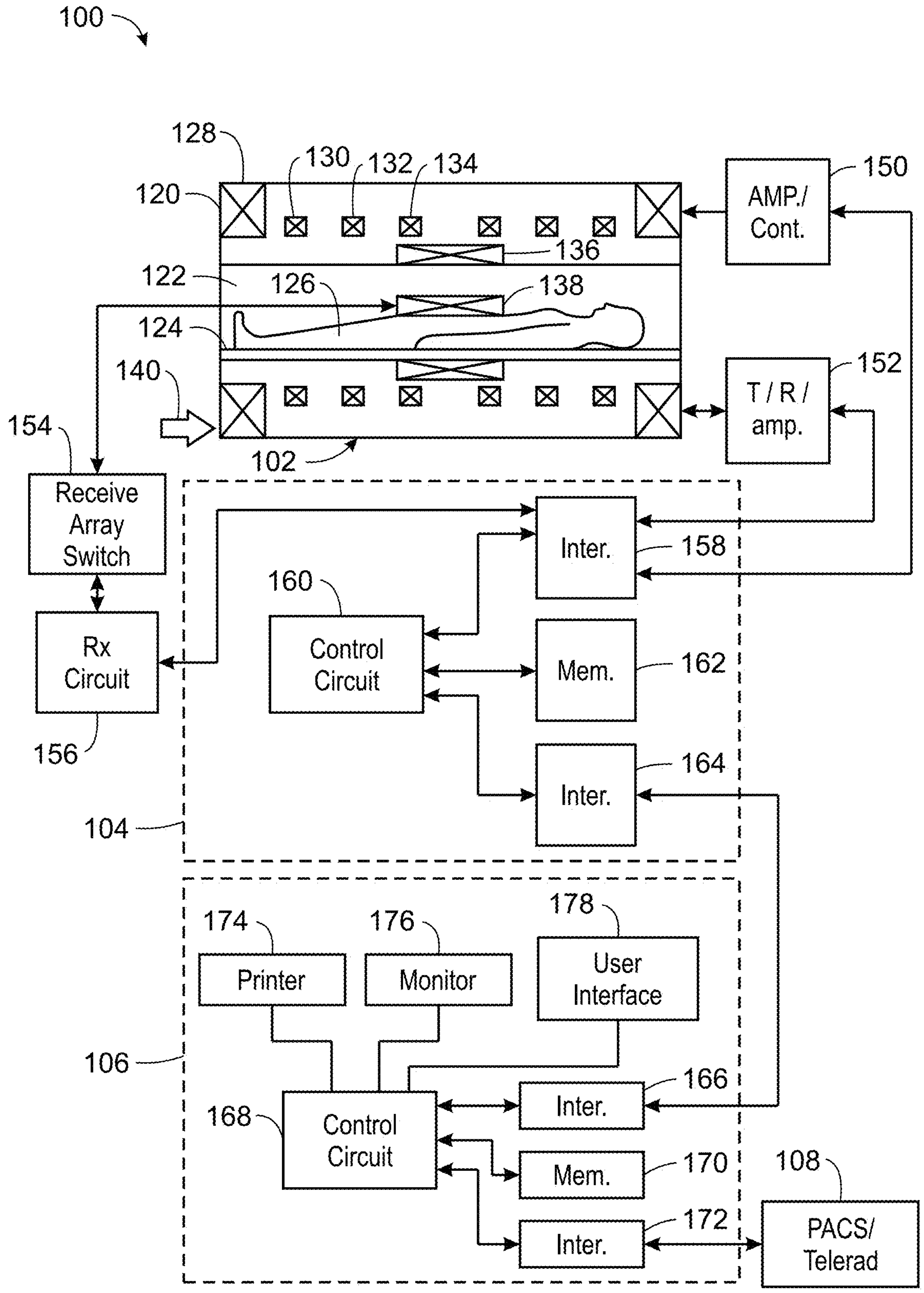
FIG. 1 illustrates an embodiment of a magnetic resonance imaging (MRI) system suitable for use with the disclosed technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion are provided in the context of medical imaging, it should be appreciated that the disclosed techniques are not limited to such medical contexts. Indeed, the provision of examples and explanations in such a medical context is only to facilitate explanation by providing instances of real-world implementations and applications. However, the disclosed techniques may also be utilized in other contexts, such as image reconstruction for non-destructive inspection of manufactured parts or goods (i.e., quality control or quality review applications), and/or the non-invasive inspection of packages, boxes, luggage, and so forth (i.e., security or screening applications). In general, the disclosed techniques may be useful in any imaging or screening context or image processing or photography field where a set or type of acquired data undergoes a reconstruction process to generate an image or volume.

Deep-learning (DL) approaches discussed herein may be based on artificial neural networks, and may therefore encompass one or more of deep neural networks, fully connected networks, convolutional neural networks (CNNs), unrolled neural networks, perceptrons, encoders-decoders, recurrent networks, wavelet filter banks, u-nets, general adversarial networks (GANs), dense neural networks, or other neural network architectures. The neural networks may include shortcuts, activations, batch-normalization layers, and/or other features. These techniques are referred to herein as DL techniques, though this terminology may also be used specifically in reference to the use of deep neural networks, which is a neural network having a plurality of layers.

One type of deep learning model is a vision transformer model. A vision transformer model utilizes transformers (e.g., vision transformers) for image recognition tasks. In particular, a vision transformer model breaks down an input image (e.g., medical image) into patches, processes these patches using transformers, and aggregates the information for classification or object detection. A vision transformer model utilizes self-attention (i.e., a global operation) since it draws information from the whole image. This enables the vision transformer model to capture distinct semantic relevancies in an image effectively. Vision transformer models obtain similar or better results than other types of deep learning models (e.g., convolutional networks) while requiring substantially fewer computational resources to train.

As discussed herein, DL techniques (which may also be known as deep machine learning, hierarchical learning, or deep structured learning) are a branch of machine learning techniques that employ mathematical representations of data and artificial neural networks for learning and processing such representations. By way of example, DL approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one ‘stage’ of the process. Each stage of the process can be performed by separate neural networks or by different parts of one larger neural network.

The present disclosure provides systems and methods for data adaptive single-shot multi-label segmentation with foundation models. In particular, a contrastive learning-based technique is utilized that allows for feature similarity to be driven using task data itself without the need for any manual tuning. Moreover, it allows for multiple tasks on the same data to be completed in a single instance, thereby enabling multi-label single shot localization and region of interest segmentation with foundation models to be utilized with medical imaging data (e.g., three-dimensional (3D) imaging data). A self-supervised model is trained on an unlabeled pool of data using a vision transformer (e.g., unsupervised vision transformer) as the backbone with the objective of deriving robust feature representations of images that are contextually dependent features. The vision transformer architecture enables deriving patch level features which can be extended to pixel level features (via simple postprocessing). In addition, a contrastive similarity metric learning model is trained on the pixel level features derived from the vision transformer to push similar features as close as possible and pushing dissimilar features as apart as possible. This done by creating sample data for a task, augmenting them by simulating variations expected in real life scenarios for the task, creating pairs of positive and negative feature vectors for each of the multiple tasks, to account for the variability within the feature vectors, and generating a model. The application of this model for any new test data eliminates utilizing heuristic manual thresholding (e.g., previously utilized with localization attempts that utilized foundation models) by automatically finding the similarity between the feature vectors for localization. In particular, the contrastive similarity metric learning model performs the thresholding utilizing a data driven approach. The localization output is chained with a promptable foundation Segment Anything Model (SAM) segmentation model with prompts selected automatically within the localized region to obtain finer segmentation regions. In addition, the disclosed systems and methods may automatically select the medical image closet to a template image (i.e., most relevant medical image) using image level features to reduce processing time and to remove potential false positives which might otherwise be generated in the images.

The disclosed systems and methods include obtaining a medical image of a portion of a subject. The disclosed systems and methods also include receiving a selection of both a template image and a region of interest within the template image, wherein the region of interest is marked in the template image and is associated with a label. The disclosed systems and methods further include inputting both the medical image and the template image into a trained vision transformer model. The disclosed systems and methods even further include outputting from the trained vision transformer model both pixel level feature vectors from the medical image and a reference pixel level feature vector from the region of interest of the template image. The disclosed systems and methods still further include inputting both the pixel level feature vectors and the reference pixel level feature vector into a trained contrastive similarity metric learning model, wherein the trained contrastive similarity metric learning model is configured to automatically determine which of the pixel level feature vectors are similar to the reference pixel level feature vector. The disclosed systems and methods yet further includes outputting from the trained contrastive similarity metric learning model pixels that are similar to reference pixels. The disclosed systems and methods further include labeling the pixels in the medical image associated with the pixel level feature vectors that are similar to the reference pixel level feature vector with an initial segmentation mask, wherein the pixels that are labeled in the medical image correspond to the region of interest.

In certain embodiments, the disclosed systems and methods include utilizing a promptable segmentation model to label the medical image with a refined segmentation mask of a region that corresponds to the region of interest, wherein the initial segmentation mask serves as an automatic prompt for labeling. In certain embodiments, labeling pixels in the medical image associated with the pixel level feature vectors that are similar to the reference pixel level feature vector includes utilizing connected component analysis on the pixels to generate the initial segmentation mask.

In certain embodiments, the disclosed systems and methods include obtaining a medical imaging volume of the portion of the subject, wherein the medical imaging volume includes a plurality of medical images including the medical image. In certain embodiments, the disclosed systems and methods include inputting each medical image of the plurality of medical images into the trained vision transformer model. In certain embodiments, the disclosed embodiments further include outputting from the trained vision transformer model respective pixel level feature vectors from each medical image of the plurality of medical images. In certain embodiments, the disclosed systems and methods even further include inputting the respective pixel level feature vectors into the trained contrastive similarity metric learning model from each medical image of the plurality of medical images. In certain embodiments, the disclosed systems and methods further include outputting from the trained contrastive similarity metric learning model respective pixels from each medical image of the plurality of medical images that are similar to reference pixels. In certain embodiments, the disclosed systems and methods even further include labeling the respective pixels in each medical image of the plurality of medical images associated with the respective pixel level feature vectors from each medical image of the plurality of medical images that are similar to the reference pixel level feature vector with a respective initial segmentation mask, wherein the respective pixels that are labeled in each medical image of the plurality of medical images correspond to the region of interest. In certain embodiments, the disclosed systems and methods include utilizing the promptable segmentation model to label each medical image of the plurality of medical images with a respective refined segmentation mask of a respective region that corresponds to the region of interest, wherein the respective initial segmentation mask serves as an automatic prompt for labeling.

In certain embodiments, the disclosed systems and methods include obtaining a medical imaging volume of the portion of the subject, wherein the medical imaging volume includes a plurality of medical images including the medical image. In certain embodiments, the disclosed systems and methods also include inputting each medical image of the plurality of medical images into the trained vision transformer model. In certain embodiments, the disclosed systems and methods further include outputting from the trained vision transformer model respective pixel level feature vectors and respective image level features from each medical image of the plurality of medical images. determine a set of most relevant medical images from the plurality of medical images. In certain embodiments, the disclosed systems and methods even include inputting the respective pixel level feature vectors into the trained contrastive similarity metric learning model from the set of most relevant medical images. In certain embodiments, the disclosed systems and methods yet further include outputting from the trained contrastive similarity metric learning model respective pixels from the set of most relevant medical images that are similar to reference pixels. In certain embodiments, the disclosed systems and methods include labeling the respective pixels in each medical image of the set of most relevant medical images associated with the respective pixel level feature vectors from each medical image of the set of most relevant medical images that are similar to the reference pixel level feature vector with a respective initial segmentation mask, wherein the respective pixels that are labeled in each medical image of the set of most relevant medical images correspond to the region of interest. In certain embodiments, the disclosed systems and method include utilizing the promptable segmentation model to label each medical image of the set of most relevant medical images with a respective refined segmentation mask of a respective region that corresponds to the region of interest, wherein the respective initial segmentation mask serves as an automatic prompt for labeling. In certain embodiments, the disclosed systems and methods include determining the set of most relevant medical images from the plurality of medical images is based on the image level features.

In certain embodiments, the disclosed systems and methods include receiving the selection of a plurality of regions of interest within the template image, wherein each region of interest of the plurality of regions of interest is respectively marked in the template image and is associated with a respective label. In certain embodiments, the disclosed systems and methods also include outputting from the trained vision transformer model a respective reference pixel level feature vectors from each region of interest of the plurality of regions of interest of the template image. In certain embodiments, the disclosed systems and methods further include inputting each respective reference pixel level feature vector into the trained contrastive similarity metric learning model, wherein the trained contrastive similarity metric learning model is configured to automatically determine which of the pixel level feature vectors are similar to each respective reference pixel level feature vector for each region of interest. In certain embodiments, the disclosed systems and methods even further include outputting, via the processor, from the trained contrastive similarity metric learning model respective groups of pixels that are similar to each of respective reference pixels for each region of interest. In certain embodiments, the disclosed systems and methods include individually labeling the respective groups of pixels in the medical image associated with each group of the respective groups of pixel level feature vectors that are similar to each respective reference pixel level feature vector for each region of interest with a respective initial segmentation mask, wherein the respective groups of pixels that are individually labeled in the medical image correspond to the respective regions of interest of the plurality of regions of interest. In certain embodiments, the disclosed systems and methods include utilizing a promptable segmentation model to label the medical image with respective refined segmentation masks of respective regions that respectively correspond to the respective regions of interest of the plurality of regions of interest, wherein the respective initial segmentation masks serve as automatic prompts for labeling.

The disclosed techniques may be utilized for localization. In addition, the disclosed techniques may be utilized for longitudinal lesion tracking across multiple time points. The disclosed techniques may be utilized with different types of medical images. For example, the images may be obtained from MRI, computed tomography (CT) imaging, or other types of imaging systems. In the present disclosure, the techniques are described in the context of MRI.

With the preceding in mind, FIG. 1 a magnetic resonance imaging (MRI) system 100 is illustrated schematically as including a scanner 102, scanner control circuitry 104, and system control circuitry 106. According to the embodiments described herein, the MRI system 100 is generally configured to perform MR imaging.

System 100 additionally includes remote access and storage systems or devices such as picture archiving and communication systems (PACS) 108, or other devices such as teleradiology equipment so that data acquired by the system 100 may be accessed on- or off-site. In this way, MR data may be acquired, followed by on- or off-site processing and evaluation. While the MRI system 100 may include any suitable scanner or detector, in the illustrated embodiment, the system 100 includes a full body scanner 102 having a housing 120 through which a bore 122 is formed. A table 124 is moveable into the bore 122 to permit a patient 126 (e.g., subject) to be positioned therein for imaging selected anatomy within the patient.

Scanner 102 includes a series of associated coils for producing controlled magnetic fields for exciting the gyromagnetic material within the anatomy of the patient being imaged. Specifically, a primary magnet coil 128 is provided for generating a primary magnetic field, $B_0$, which is generally aligned with the bore 122. A series of gradient coils 130, 132, and 134 permit controlled magnetic gradient fields to be generated for positional encoding of certain gyromagnetic nuclei within the patient 126 during examination sequences. A radio frequency (RF) coil 136 (e.g., RF transmit coil) is configured to generate radio frequency pulses for exciting the certain gyromagnetic nuclei within the patient. In addition to the coils that may be local to the scanner 102, the system 100 also includes a set of receiving coils or RF receiving coils 138 (e.g., an array of coils) configured for placement proximal (e.g., against) to the patient 126. As an example, the receiving coils 138 can include cervical/thoracic/lumbar (CTL) coils, head coils, single-sided spine coils, and so forth. Generally, the receiving coils 138 are placed close to or on top of the patient 126 so as to receive the weak RF signals (weak relative to the transmitted pulses generated by the scanner coils) that are generated by certain gyromagnetic nuclei within the patient 126 as they return to their relaxed state.

The various coils of system 100 are controlled by external circuitry to generate the desired field and pulses, and to read emissions from the gyromagnetic material in a controlled manner. In the illustrated embodiment, a main power supply 140 provides power to the primary field coil 128 to generate the primary magnetic field, $B_0$. A power input (e.g., power from a utility or grid), a power distribution unit (PDU), a power supply (PS), and a driver circuit 150 may together provide power to pulse the gradient field coils 130, 132, and 134. The driver circuit 150 may include amplification and control circuitry for supplying current to the coils as defined by digitized pulse sequences output by the scanner control circuitry 104.

Another control circuit 152 is provided for regulating operation of the RF coil 136. Circuit 152 includes a switching device for alternating between the active and inactive modes of operation, wherein the RF coil 136 transmits and does not transmit signals, respectively. Circuit 152 also includes amplification circuitry configured to generate the RF pulses. Similarly, the receiving coils 138 are connected to switch 154, which is capable of switching the receiving coils 138 between receiving and non-receiving modes. Thus, the receiving coils 138 resonate with the RF signals produced by relaxing gyromagnetic nuclei from within the patient 126 while in the receiving mode, and they do not resonate with RF energy from the transmitting coils (i.e., coil 136) so as to prevent undesirable operation while in the non-receiving mode. Additionally, a receiving circuit 156 is configured to receive the data detected by the receiving coils 138 and may include one or more multiplexing and/or amplification circuits.

It should be noted that while the scanner 102 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 104, 106.

As illustrated, scanner control circuitry 104 includes an interface circuit 158, which outputs signals for driving the gradient field coils and the RF coil and for receiving the data representative of the magnetic resonance signals produced in examination sequences. The interface circuit 158 is coupled to a control and analysis circuit 160. The control and analysis circuit 160 executes the commands for driving the circuit 150 and circuit 152 based on defined protocols selected via system control circuit 106.

Control and analysis circuit 160 also serves to receive the magnetic resonance signals and performs subsequent processing before transmitting the data to system control circuit 106. Scanner control circuit 104 also includes one or more memory circuits 162, which store configuration parameters, pulse sequence descriptions, examination results, and so forth, during operation.

Interface circuit 164 is coupled to the control and analysis circuit 160 for exchanging data between scanner control circuitry 104 and system control circuitry 106. In certain embodiments, the control and analysis circuit 160, while illustrated as a single unit, may include one or more hardware devices. The system control circuit 106 includes an interface circuit 166, which receives data from the scanner control circuitry 104 and transmits data and commands back to the scanner control circuitry 104. The control and analysis circuit 168 may include a CPU in a multi-purpose or application specific computer or workstation. Control and analysis circuit 168 is coupled to a memory circuit 170 to store programming code for operation of the MRI system 100 and to store the processed image data for later reconstruction, display and transmission. The programming code may execute one or more algorithms that, when executed by a processor, are configured to perform reconstruction of acquired data as described below. In certain embodiments, the memory circuit 170 may store vision transformer models for the techniques described below. In certain embodiments, image reconstruction may occur on a separate computing device having processing circuitry and memory circuitry.

An additional interface circuit 172 may be provided for exchanging image data, configuration parameters, and so forth with external system components such as remote access and storage devices 108. Finally, the system control and analysis circuit 168 may be communicatively coupled to various peripheral devices for facilitating operator interface and for producing hard copies of the reconstructed images. In the illustrated embodiment, these peripherals include a printer 174, a monitor 176, and user interface 178 including devices such as a keyboard, a mouse, a touchscreen (e.g., integrated with the monitor 176), and so forth.

Figure 2:
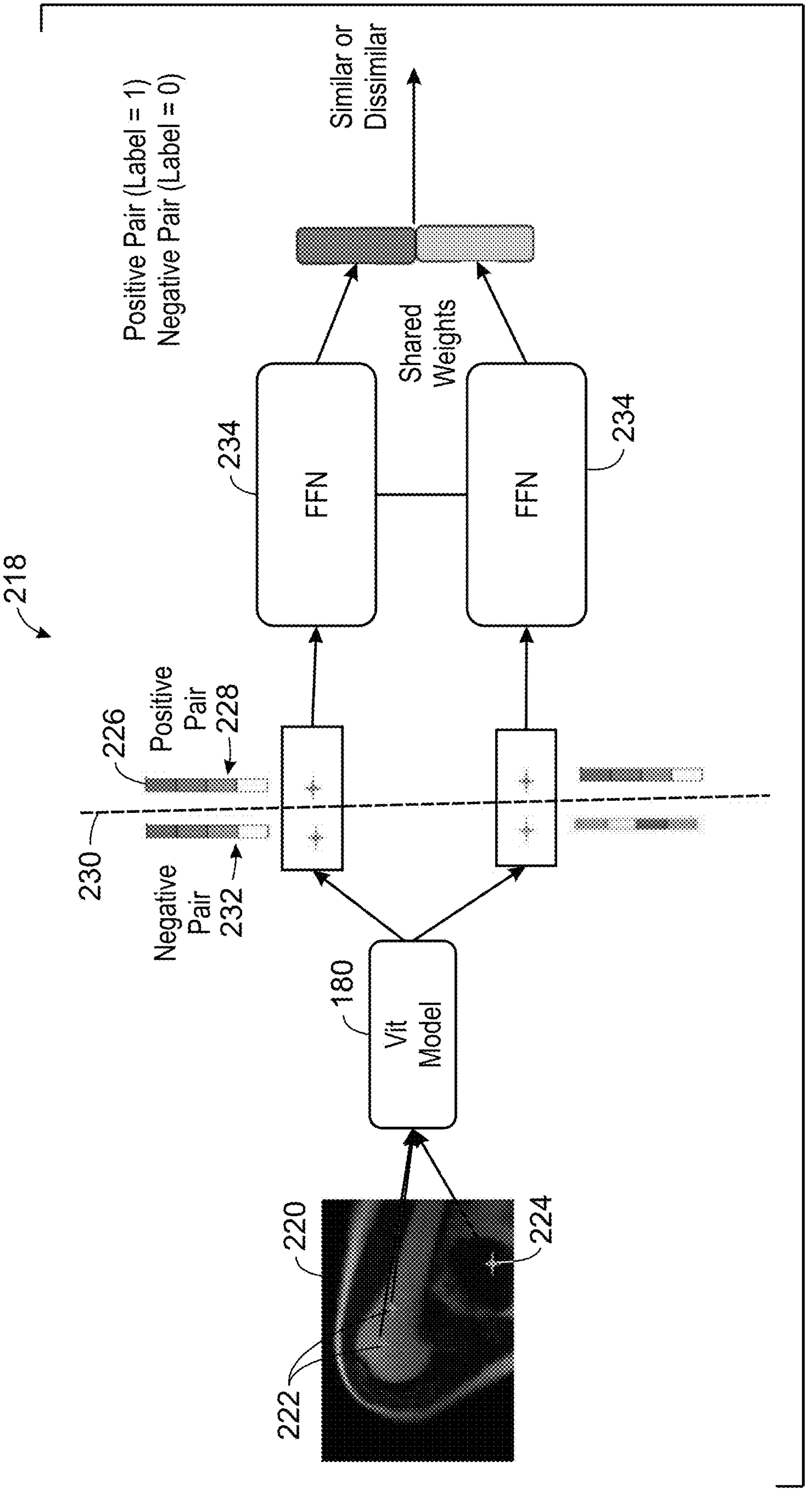
FIG. 2 illustrates a schematic diagram of training of a contrastive similarity metric learning model for localization, in accordance with aspects of the present disclosure.

FIG. 2 illustrates a schematic diagram of training (e.g., supervised training) of a contrastive similarity metric learning model 218 for localization. A plurality of medical images are obtained. In certain embodiments, the plurality of medical images are MR images. In certain embodiments, the plurality of medical images may be derived from other types of imaging (e.g., CT imaging). Each medical image is subject to multiple augmentations (e.g., cropping, transformation, rotation, etc.). This enables the contrastive similarity metric learning model 218, upon training, to be robust to variations in real life images. As depicted in FIG. 2, a medical image 220 (representing one of the plurality of medical images) is labeled with areas (e.g., two areas to create positive feature features) within a first region selected and marked (as indicated by reference numeral 222) and an area in a different region (e.g., dissimilar to the first region to create negative feature vectors) selected and marked (as indicated by reference numeral 224). As depicted, the labeling of the medical image 220 is binary. In certain embodiments, the medical image 220 can be labeled with multiple labels. The medical image 220 (along with the augmented versions of the medical image) is inputted into trained vision transformer model 180. The trained vision transformer model 180 outputs both patch level features (e.g., patch level feature vectors) (not shown) and image level features (not shown) from the medical image 220 (and the augmented versions of the medical image). Pixel level features (e.g., pixel level feature vectors) 226 are interpolated from the patch level features.

The pixel level feature vectors 226 are inputted into the contrastive similarity metric learning model 218. The contrastive similarity metric learning model 218 is trained to push similar pixel level feature vectors (e.g., positive pairs such as positive pair 228 on a right side of dotted line 230) as close as possible (e.g., minimize distance in the embedding space) and to push dissimilar pixel level feature vectors (e.g., negative pairs such as negative pair 232 on the left side of the dotted line 230) as apart as possible (e.g., maximize distance in the embedding space). The contrastive similarity learning model 218 includes two feed forward neural networks (FFN) 234. The positive pairs are given a weight of 1 and negative pairs are given a label of 0. The two feed forward neural networks 234 have shared weights. The contrastive similarity metric learning model 218 outputs which pixel level feature vectors are similar and pixel level feature vectors are dissimilar.

In certain embodiments, each feed forward neural network 234 has a three layer network (e.g., with 512, 256, and 128 neurons in the respective layers). In certain embodiments, the contrastive similarity metric learning model 180 has a batch size of 64. In certain embodiments, the learning rate of the contrastive similarity metric learning model 180 is 0.01. In certain embodiments, the contrastive similarity metric learning model 180 may utilize a stochastic optimization technique that allows for per-dimension learning rate method for stochastic gradient descent. The variables of the contrastive similarity metric learning model 180 may vary from these.

The contrastive similarity metric learning model 218 as utilized in the present disclosure was trained utilizing 10 medical images and their respective augmentations. The contrastive similarity metric learning model 218 as utilized in the present disclosure was tested with a test set of 5 images with a test set accuracy of 0.88.

Figure 3:
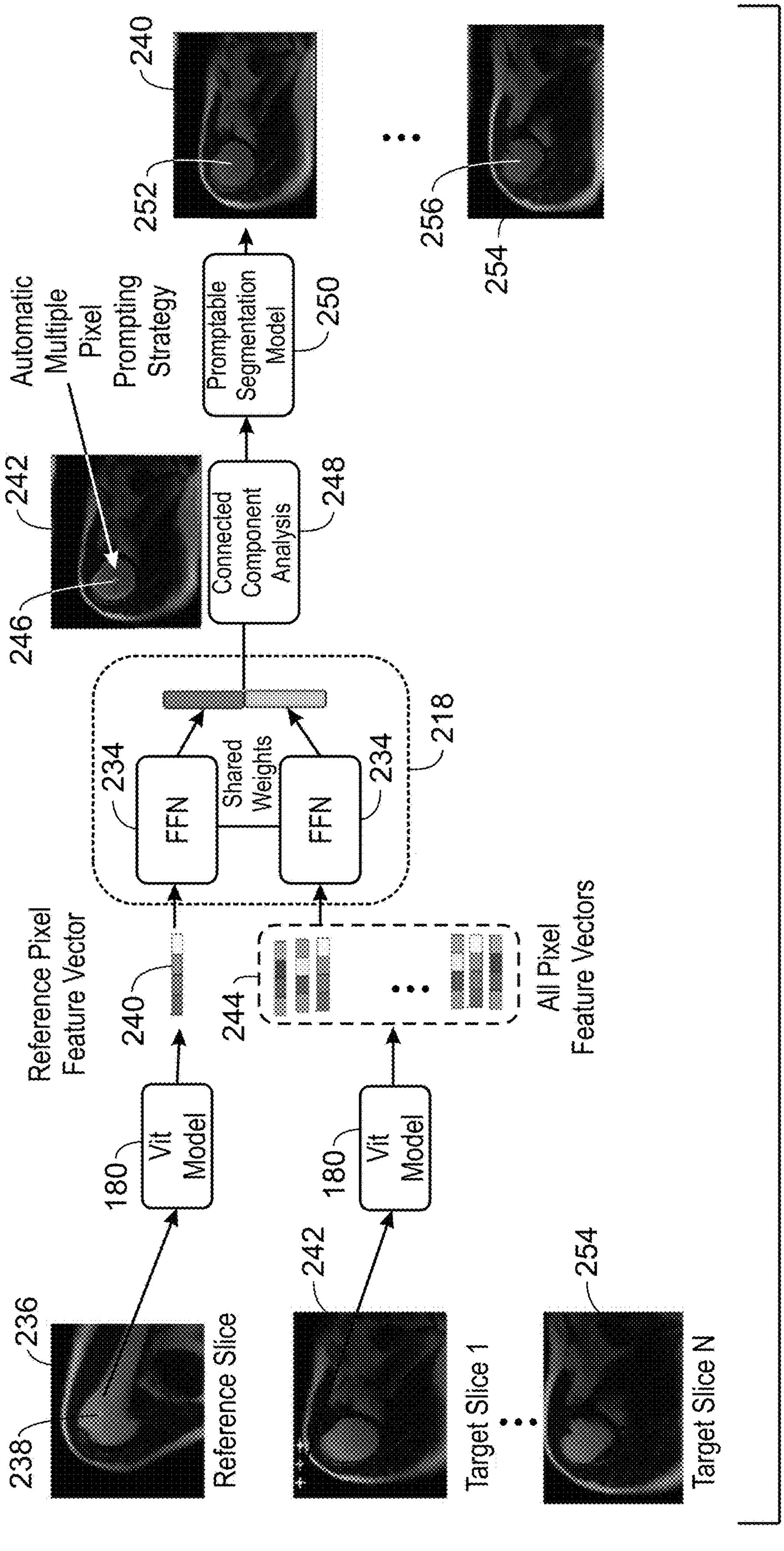
FIG. 3 illustrates a schematic diagram for data adaptive single-shot segmentation with foundation models, in accordance with aspects of the present disclosure.

FIG. 3 illustrates a schematic diagram for data adaptive single-shot segmentation with foundation models. FIG. 3 depicts the process for a single task (e.g., localization and segmentation of a single region of interest) but it may be extended for multiple tasks (i.e., localization and segmentations of multiple regions of interest) in a single shot. A template image 236 (e.g., reference slice) is received or obtained that includes a selection of a region of interest within the template image (e.g., selected via user input by a user), wherein the region of interest is marked with a reference marker (as indicated by reference numeral 238) in the template image 236 and is associated with a label. The template image 236 includes one or more anatomical landmarks assigned a respective anatomical label. The template image 236 is an MR image. The template image 236 is inputted into the trained vision transformer model 180. The vision transformer model 180 outputs a reference pixel level feature vector 240 from the region of interest of the template image 236. As depicted, the region of interest is an anatomical landmark. In certain embodiments, the region is of interest is a lesion.

Medical imaging data (e.g., medical imaging volume) acquired of a portion (e.g., shoulder) of a subject is obtained. The medical imaging data includes multiple slices or medical images. The medical imaging data in FIG. 3 is MR imaging data. A medical image 242 (e.g., target slice 1) is inputted into the trained vision transformer model 180. The trained vision transformer model 180 outputs pixel level feature vectors 244 from the medical image 242. The pixel level feature vectors 244 are derived from patch level feature vectors via interpolation. In certain embodiments, the trained vision transformer model 180 also outputs image level features (not shown). The pixel level feature vectors 244 (e.g., all of the pixel level features obtained from the medical image 242) and the reference pixel level feature vector 240 are inputted into the trained contrastive similarity metric learning model 218, wherein the trained contrastive similarity metric learning model 218 is configured to automatically determine which of the pixel level feature vectors 244 are similar to the reference pixel level feature vector 240. The trained contrastive similarity metric learning model 218 outputs the pixel level feature vectors 244 that are similar to the reference pixel level feature vector 240 and the pixel level feature vectors 244 that dissimilar to the reference pixel level feature vector 240.

Pixels in the medical image 242 associated with the pixel level feature vectors 244 that are similar to the reference pixel level feature vector 240 are labeled with an initial segmentation mask 246, wherein the pixels that are labeled in the medical image 242 correspond to the region of interest (as selected in the template image 236). In certain embodiments, connected component analysis is utilized to label the pixels to generate the initial segmentation mask 246 as indicated by reference numeral 248. The medical image with the initial segmentation mask 246 is inputted into a promptable segmentation model 250. In certain embodiments, the promptable segmentation model 250 is an image segmentation foundation model or generalized segmentation refinement model such as a promptable foundation SAM segmentation model that is configured to refine segmentation for the region of interest. The promptable segmentation model 250 outputs the medical image 242 labeled with a more accurate (e.g., refined) segmentation mask 252 of a region that corresponds to the region of interest. The initial segmentation mask 246 serves as an automatic prompt for labeling.

In certain embodiments, one or more additional medical images 254 (e.g., target slice 254) may be processed in similar manner to medical image 254 to localize and segment the region of interest as depicted in medical image 254 having a respective more accurate segmentation mask 256. In certain embodiments, the process may be utilized on all of the medical image images in an imaging volume of the portion of the subject. In certain embodiments, the process may only be carried out in its entirety on less than an entirety of the medical images in the imaging volume. In particular, in certain embodiments, the most relevant medical images in the imaging volume (i.e., the images closest or most similar to the template image) are processed. In certain images, the respective image level features may be utilized in automatically selecting the most relevant medical images in the imaging volume. In certain embodiments, the data adaptive single-shot segmentation with foundation models may be utilized for localizing and segmenting multiple different regions of interest in the medical imaging data based on multiple and different selections of the different regions of interest on the same template image.

Figure 4:
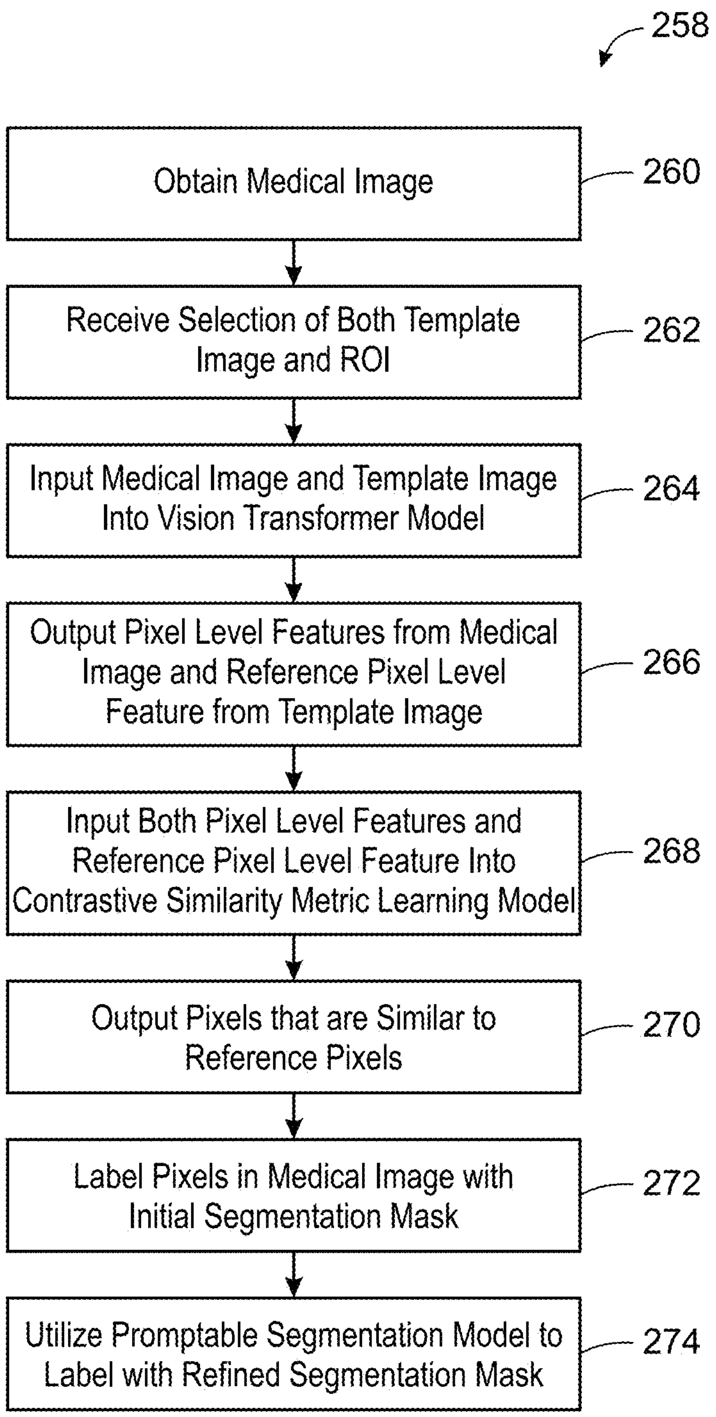
FIG. 4 illustrates a flow diagram of a method for performing data adaptive single-shot segmentation with foundation models, in accordance with aspects of the present disclosure.

FIG. 4 illustrates a flow diagram of a method 258 for performing data adaptive single-shot segmentation with foundation models. One or more steps of the method 258 may be performed by processing circuitry of the magnetic resonance imaging system 100 in FIG. 1, processing circuitry of an imaging system of another type (e.g., CT imaging system), or processing circuitry of a separate computing device. One or more of the steps of the method 258 may be performed simultaneously or in a different order from the order depicted in FIG. 4. The method 258 may be utilized for anatomy localization, lesion detection, or other type of application.

The method 258 includes obtaining a medical image (e.g., target slice from an medical imaging volume) of a portion of a subject (block 260). The method 258 also includes receiving a selection of both a template image and a region of interest (ROI) (e.g., anatomical landmark or lesion) within the template image, wherein the region of interest is marked in the template image and is associated with a label (block 262). The template image includes one or more anatomical landmarks assigned a respective anatomical label. The method 258 further includes inputting (e.g., separately) both the medical image and the template image into a trained vision transformer model (block 264). The method 258 even further includes outputting from the trained vision transformer model both pixel level feature vectors from the medical image and a reference pixel level feature vector from the region of interest of the template image (block 266). The method 258 still further includes inputting both the pixel level feature vectors and the reference pixel level feature vector into a trained contrastive similarity metric learning model, wherein the trained contrastive similarity metric learning model is configured to automatically determine which of the pixel level feature vectors are similar to the reference pixel level feature vector (block 268). The method 258 yet further includes outputting from the trained contrastive similarity metric learning model pixels that are similar to reference pixels (block 270). The method 258 further includes labeling the pixels in the medical image associated with the pixel level feature vectors that are similar to the reference pixel level feature vector with an initial segmentation mask, wherein the pixels that are labeled in the medical image correspond to the region of interest (block 272). In certain embodiments, labeling pixels in the medical image associated with the pixel level feature vectors that are similar to the reference pixel level feature vector includes utilizing connected component analysis on the pixels to generate the initial segmentation mask. The method 258 even further includes utilizing a promptable segmentation model to label the medical image with a refined segmentation mask of a region that corresponds to the region of interest, wherein the initial segmentation mask serves as an automatic prompt for labeling (block 274).

Figure 5:
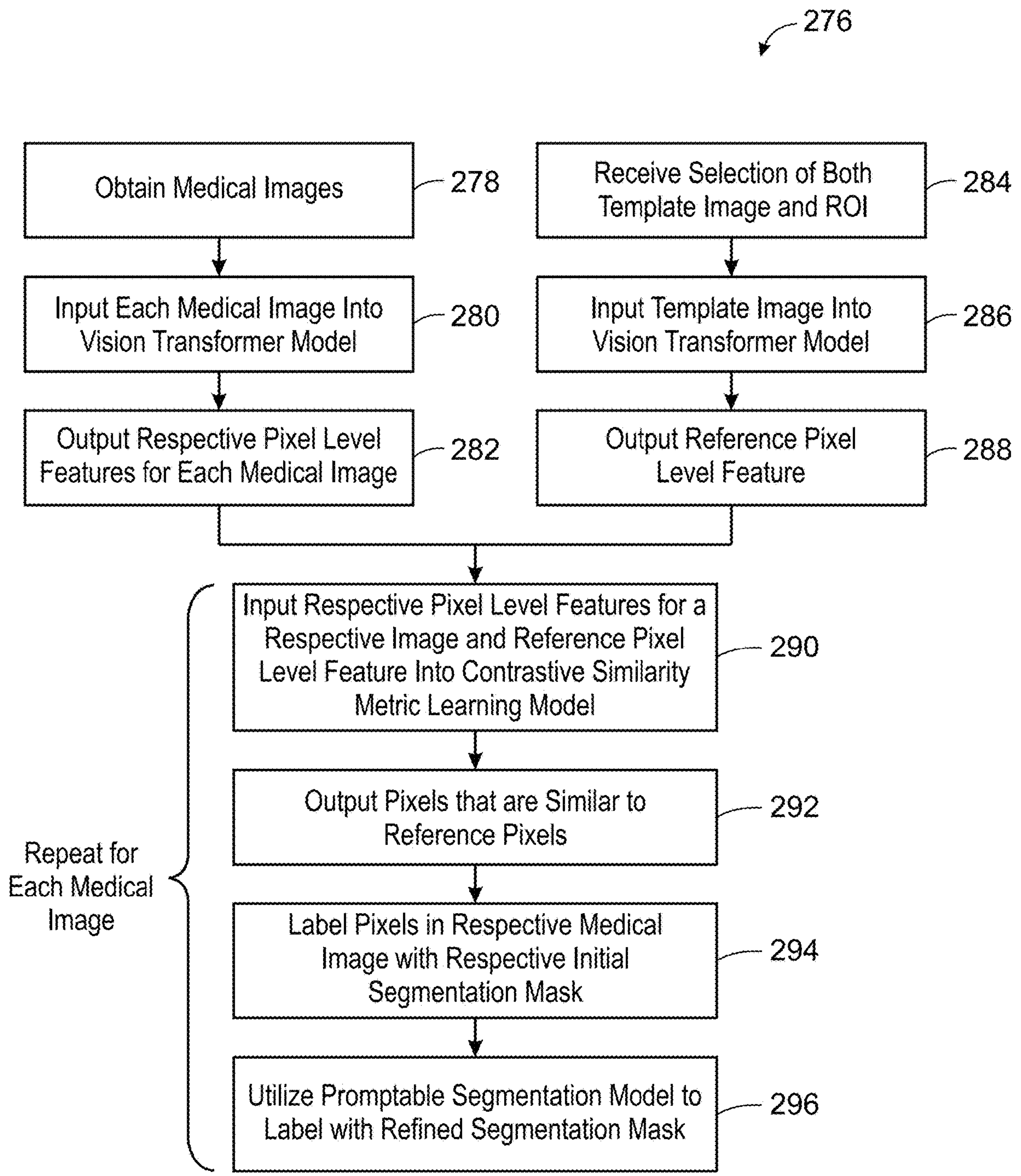
FIG. 5 illustrates a flow diagram of a method for performing data adaptive single-shot segmentation with foundation models (e.g., on a plurality of medical images), in accordance with aspects of the present disclosure.

FIG. 5 illustrates a flow diagram of a method 276 for performing data adaptive single-shot segmentation with foundation models (e.g., on a plurality of medical images or slices). One or more steps of the method 276 may be performed by processing circuitry of the magnetic resonance imaging system 100 in FIG. 1, processing circuitry of an imaging system of another type (e.g., CT imaging system), or processing circuitry of a separate computing device. One or more of the steps of the method 276 may be performed simultaneously or in a different order from the order depicted in FIG. 5. The method 276 may be utilized for anatomy localization, lesion detection, or other type of application.

The method 276 includes a medical imaging volume of the portion of the subject, wherein the medical imaging volume includes a plurality of medical images (e.g., slices) (block 278). The method 276 also includes inputting (e.g., separately) each medical image of the plurality of medical images into a trained vision transformer model (block 280). The method 276 further includes outputting (e.g., separately) from the trained vision transformer model respective pixel level feature vectors from each medical image of the plurality of medical images (block 282). The method 276 also include receiving a selection of both a template image and a region of interest (e.g., anatomical landmark or lesion) within the template image, wherein the region of interest is marked in the template image and is associated with a label (block 284). The template image includes one or more anatomical landmarks assigned a respective anatomical label. The method 276 further inputting the template image into the trained vision transformer model (block 286). The method 276 even further includes outputting from the trained vision transformer model a reference pixel level feature vector from the region of interest of the template image (block 288). The method 276 still further includes inputting both the respective pixel level feature vectors (e.g., for a respective medical image) and the reference pixel level feature vector into a trained contrastive similarity metric learning model, wherein the trained contrastive similarity metric learning model is configured to automatically determine which of the respective pixel level feature vectors are similar to the reference pixel level feature vector (block 290). The method 276 yet further includes outputting from the trained contrastive similarity metric learning model pixels that are similar to reference pixels (block 292). The method 276 further includes labeling the pixels in the respective medical image associated with the pixel level feature vectors that are similar to the reference pixel level feature vector with a respective initial segmentation mask, wherein the pixels that are labeled in the respective medical image correspond to the region of interest (block 294). In certain embodiments, labeling pixels in the respective medical image associated with the pixel level feature vectors that are similar to the reference pixel level feature vector includes utilizing connected component analysis on the pixels to generate the respective initial segmentation mask. The method 276 even further includes utilizing a promptable segmentation model to label the respective medical image with a respective segmentation mask of a respective region that corresponds to the region of interest, wherein the respective initial segmentation mask serves as an automatic prompt for labeling (block 296). The blocks 290-296 are repeated for each medical image of the medical imaging volume of the portion of the subject.

Figure 6:
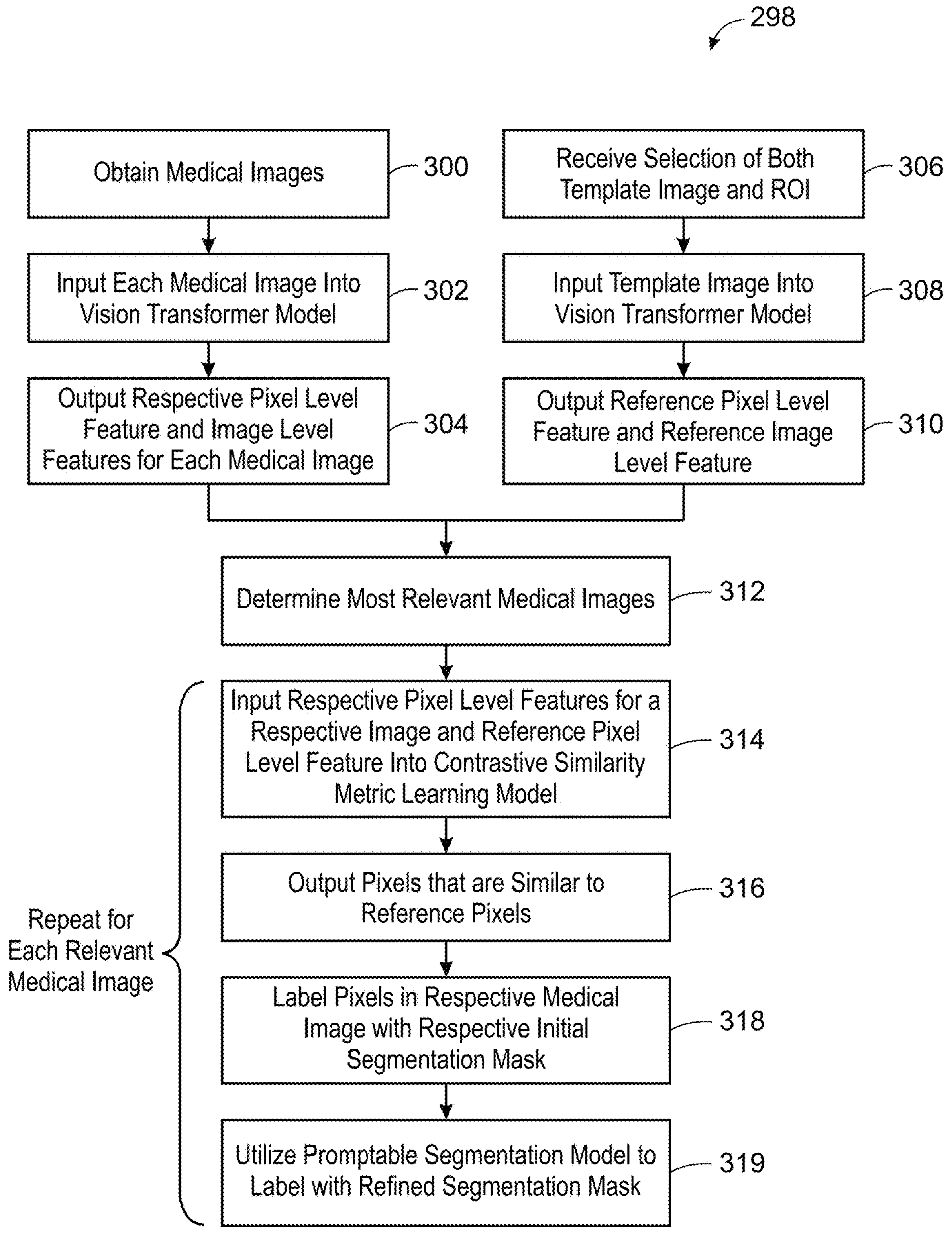
FIG. 6 illustrates a flow diagram of a method for performing data adaptive single-shot segmentation with foundation models (e.g., on relevant medical images or slices), in accordance with aspects of the present disclosure.

FIG. 6 illustrates a flow diagram of a method 298 for performing data adaptive single-shot segmentation with foundation models (e.g., on relevant medical images or slices). One or more steps of the method 298 may be performed by processing circuitry of the magnetic resonance imaging system 100 in FIG. 1, processing circuitry of an imaging system of another type (e.g., CT imaging system), or processing circuitry of a separate computing device. One or more of the steps of the method 298 may be performed simultaneously or in a different order from the order depicted in FIG. 6. The method 298 may be utilized for anatomy localization, lesion detection, or other type of application.

The method 298 includes a medical imaging volume of the portion of the subject, wherein the medical imaging volume includes a plurality of medical images (e.g., slices) (block 300). The method 298 also includes inputting (e.g., separately) each medical image of the plurality of medical images into a trained vision transformer model (block 302). The method 298 further includes outputting (e.g., separately) from the trained vision transformer model respective pixel level feature vectors and respective image level features (e.g., image tokens) from each medical image of the plurality of medical images (block 304). The method 298 also include receiving a selection of both a template image and a region of interest (e.g., anatomical landmark or lesion) within the template image, wherein the region of interest is marked in the template image and is associated with a label (block 306). The template image includes one or more anatomical landmarks assigned a respective anatomical label. The method 298 further inputting the template image into the trained vision transformer model (block 308). The method 298 even further includes outputting from the trained vision transformer model a reference pixel level feature vector and a reference image level feature (e.g., reference image token) from the region of interest of the template image (block 310). The method 298 further includes determining one or more (e.g., a set) of most relevant medical images from the plurality of medical images (block 312). The most relevant medical images are those that are the most similar to the template image. In certain embodiments, determining the most relevant medical images includes comparing (e.g., separately) the respective image level features for each medical image to the reference image level feature from the template image. In certain embodiments, the method 298 may continue for the most relevant medical image first, then followed by the next most relevant medical images of the selected relevant medical images. In certain embodiments, the method 298 may continue for only the most relevant medical image. Selecting the most relevant medical images reduces processing time. In addition, selecting the most relevant medical images removes potential false positives.

The method 298 still further includes inputting both the respective pixel level feature vectors (e.g., for a respective medical image from among the selected most relevant medical images) and the reference pixel level feature vector into a trained contrastive similarity metric learning model, wherein the trained contrastive similarity metric learning model is configured to automatically determine which of the respective pixel level feature vectors are similar to the reference pixel level feature vector (block 314). The method 298 yet further includes outputting from the trained contrastive similarity metric learning model pixels that are similar to reference pixels (block 316). The method 298 further includes labeling the pixels in the respective medical image associated with the pixel level feature vectors that are similar to the reference pixel level feature vector with a respective initial segmentation mask, wherein the pixels that are labeled in the respective medical image correspond to the region of interest (block 318). In certain embodiments, labeling pixels in the respective medical image associated with the pixel level feature vectors that are similar to the reference pixel level feature vector includes utilizing connected component analysis on the pixels to generate the respective initial segmentation mask. The method 298 even further includes utilizing a promptable segmentation model to label the respective medical image with a respective segmentation mask of a respective region that corresponds to the region of interest, wherein the respective initial segmentation mask serves as an automatic prompt for labeling (block 319). The blocks 314-319 are repeated for each of the one determined one or more relevant medical images of the medical imaging volume of the portion of the subject.

Figure 7:
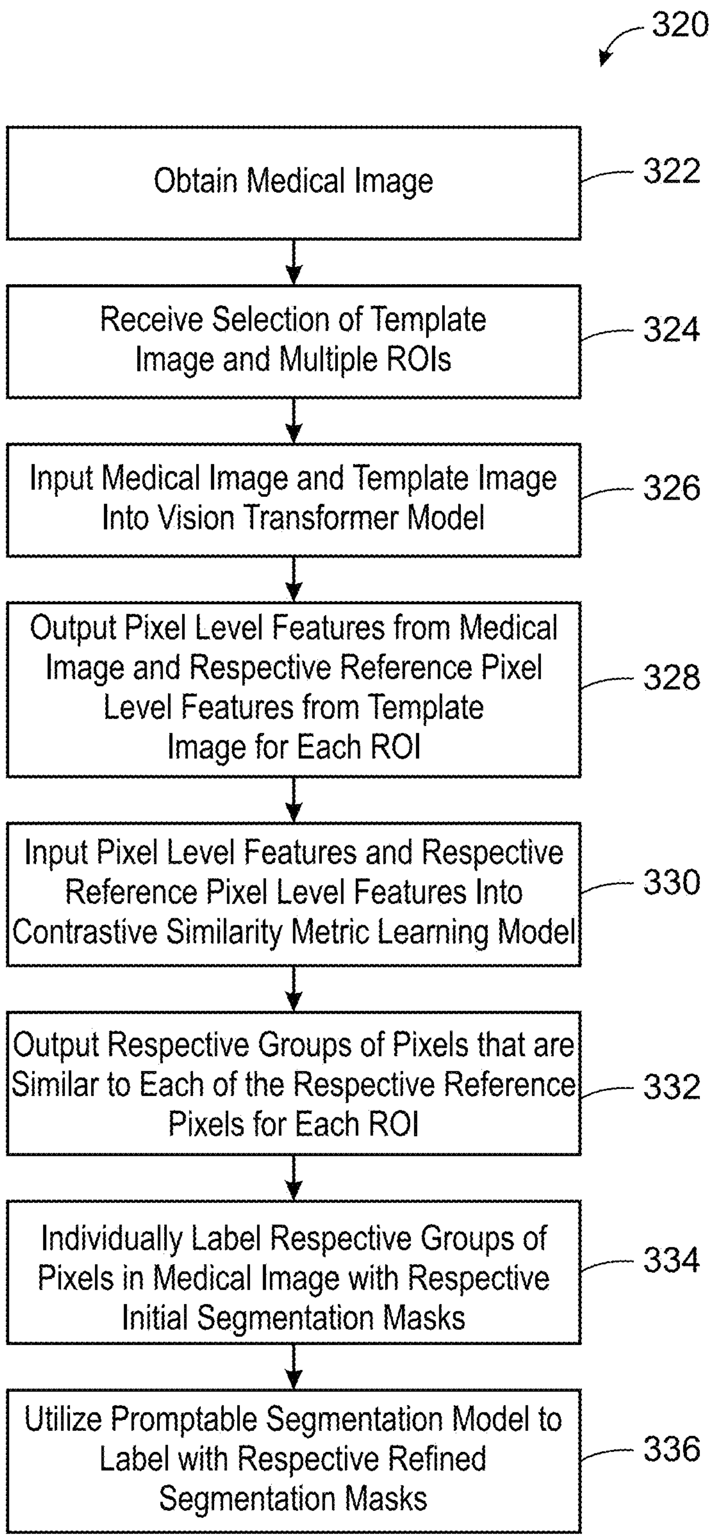
FIG. 7 illustrates a flow diagram of a method for performing data adaptive single-shot multi-label segmentation with foundation models (e.g., on relevant medical images or slices), in accordance with aspects of the present disclosure.

FIG. 7 illustrates a flow diagram of a method 320 for performing data adaptive single-shot multi-label segmentation with foundation models. One or more steps of the method 320 may be performed by processing circuitry of the magnetic resonance imaging system 100 in FIG. 1, processing circuitry of an imaging system of another type (e.g., CT imaging system), or processing circuitry of a separate computing device. One or more of the steps of the method 320 may be performed simultaneously or in a different order from the order depicted in FIG. 7. The method 320 may be utilized for anatomy localization, lesion detection, or other type of application.

The method 320 includes obtaining a medical image (e.g., target slice from an medical imaging volume) of a portion of a subject (block 322). The method 320 also includes receiving the selection of a plurality of regions of interest (ROIs) (e.g., anatomical landmarks or lesions) within the template image, wherein each region of interest of the plurality of regions of interest is respectively marked in the template image and is associated with a respective label (block 324). The template image includes one or more anatomical landmarks assigned a respective anatomical label. The method 320 further includes inputting (e.g., separately) both the medical image and the template image into a trained vision transformer model (block 326). The method 320 even further includes outputting from the trained vision transformer model pixel levels features from the medical image and respective reference pixel level feature vectors from each region of interest of the plurality of regions of interest of the template image (block 328). The method 320 still further includes inputting the pixel level feature vectors and inputting each respective reference pixel level feature vector for each region of interest into the trained contrastive similarity metric learning model, wherein the trained contrastive similarity metric learning model is configured to automatically determine which of the pixel level feature vectors are similar to each respective reference pixel level feature vector for each region of interest (block 330). The method 320 yet further includes outputting from the trained contrastive similarity metric learning model respective groups of pixels that are similar to each of respective reference pixels for each region of interest (block 332). The method 320 further includes individually labeling the respective groups of pixels in the medical image associated with each group of the respective groups of pixel level feature vectors that are similar to each respective reference pixel level feature vector for each region of interest with a respective initial segmentation mask, wherein the respective groups of pixels that are individually labeled in the medical image correspond to respective regions of interest of the plurality of regions of interest (block 334). In certain embodiments, labeling pixels in the medical image associated with the pixel level feature vectors that are similar to the respective reference pixel level feature vector for each region of interest includes utilizing connected component analysis on the pixels to generate the respective initial segmentation mask. The method 320 even further includes utilizing a promptable segmentation model to label the medical image with respective refined segmentation masks of respective regions that respectively correspond to the respective regions of interest of the plurality of regions of interest, wherein the respective initial segmentation masks serve as automatic prompts for labeling (block 336).

Figure 8:
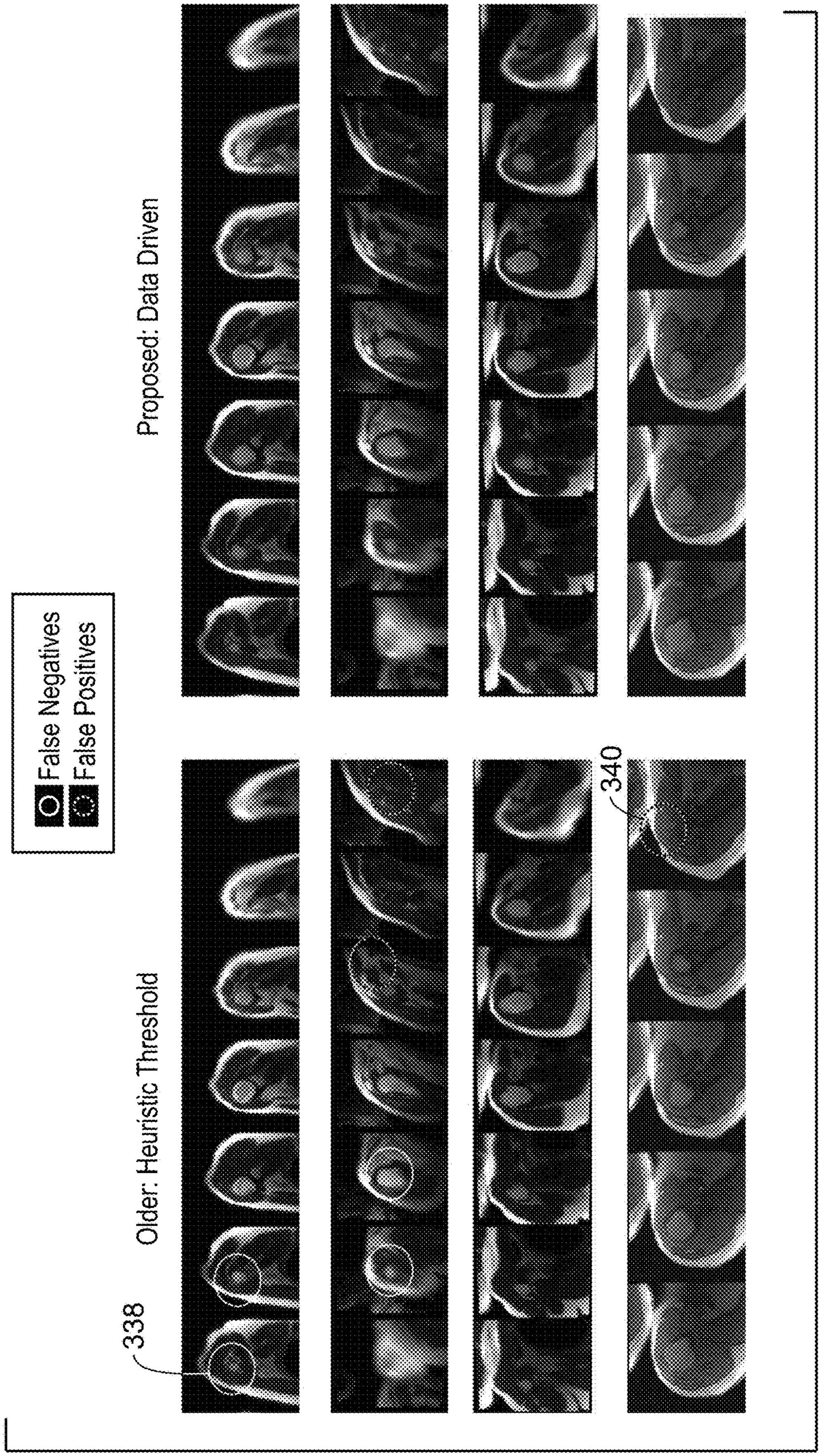
FIG. 8 depicts MR images of a shoulder comparing region of interest localization utilizing different approaches, in accordance with aspects of the present disclosure.

FIG. 8 depicts MR images of a shoulder comparing region of interest localization utilizing different approaches. The MR images on the left side of FIG. 8 are subjected to region of interest localization utilizing a heuristic threshold. The MR images on the right side of FIG. 8 are subjected to region of interest localization utilizing a data driven approach (i.e., the method 258 in FIG. 4). The rows of MR images on the left side of FIG. 8 correspond to the MR images on the right side of FIG. 8. Each row of MR images includes different slices of the shoulder. As depicted in FIG. 8, both false negatives 338 and false positives 340 are present utilizing the heuristic threshold in region of interest localization. No false negatives and no false positives are present utilizing the data driven approach in region of interest localization.

Figure 9:
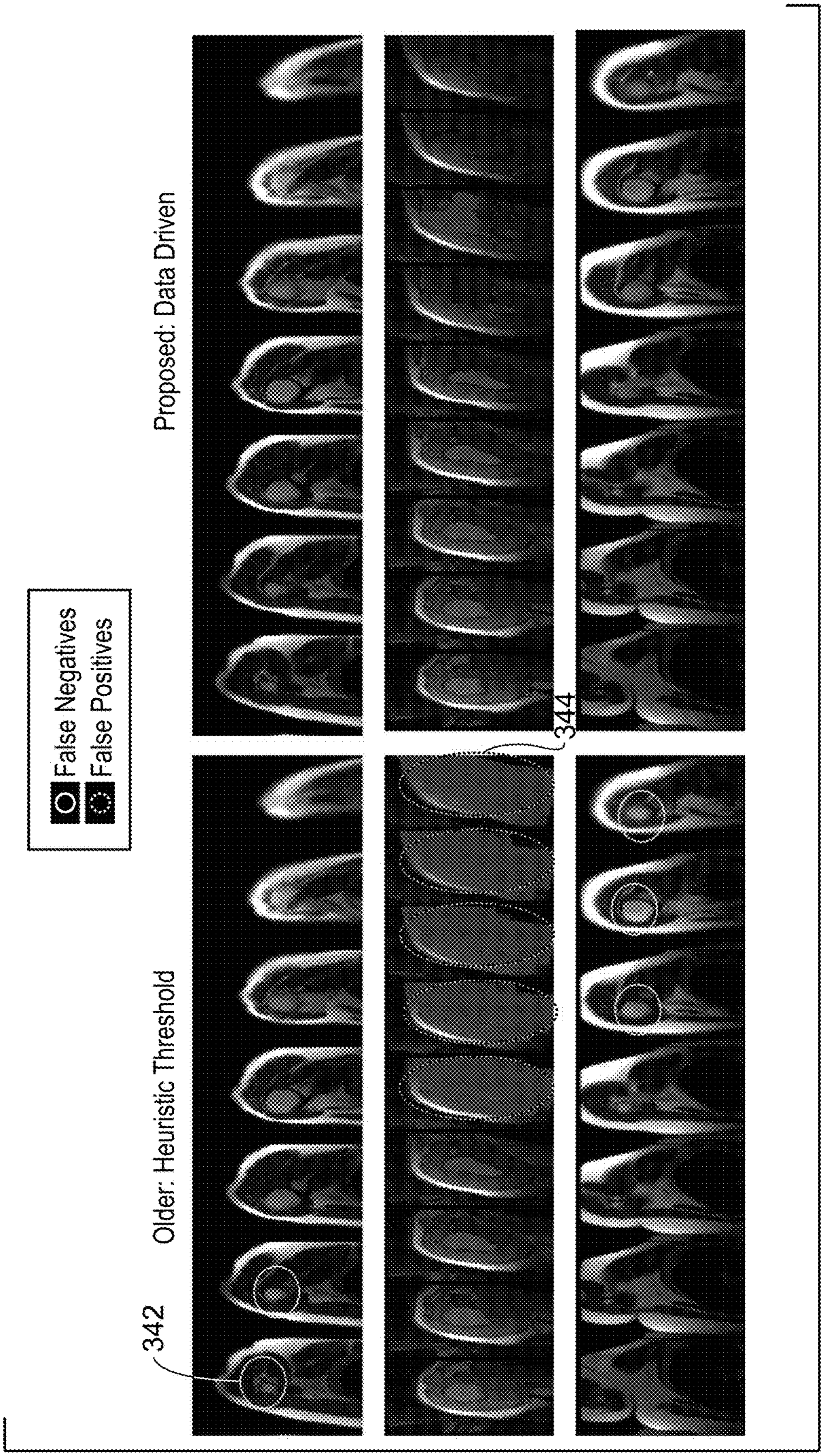
FIG. 9 depicts MR images of a shoulder comparing segmentation by using prompts from localized region of interest localization derived utilizing different approaches, in accordance with aspects of the present disclosure.

FIG. 9 depicts MR images of a shoulder comparing segmentation by using prompts from localized region of interest localization derived utilizing different approaches. The MR images on the left side of FIG. 9 are subjected to segmentation by using prompts from localized region of interest localization utilizing a heuristic threshold. The MR images on the right side of FIG. 9 are subjected to segmentation by using prompts from localized region of interest localization utilizing a data driven approach (i.e., the method 258 in FIG. 4). The rows of MR images on the left side of FIG. 9 correspond to the MR images on the right side of FIG. 9. Each row of MR images includes different slices of the shoulder. As depicted in FIG. 9, both false negatives 342 and false positives 344 are present with segmentation by using prompts from localized region of interest localization utilizing the heuristic threshold. No false negatives and no false positives are present with segmentation by using prompts from localized region of interest localization utilizing the data driven approach.

FIG. 10 depicts a table 346 comparing region of interest localization and shoulder segmentation utilizing different approaches. In particular, cosine similarity (i.e., manual thresholding or heuristic thresholding approach) is compared to the contrastive similarity (i.e., data adaptive approach) as described above in the method 258 in FIG. 4. Evaluation of the different approaches was conducted on 15 three plane localizer volumes. The localization accuracy is computed by taking the average of predicted localization falling inside the ground truth mask. The mean intersection of union (i.e., area of overlap between the predicted segmentation and the ground truth divided by the area of union between the predicted segmentation and the ground truth) is utilized to analyze segmentation accuracy. As depicted in the table 346, utilization of contrastive similarity for localization is significantly more accurate than cosine similarity. Also, as depicted in the table 346, utilization of contrastive similarity for segmentation is significantly more accurate than cosine similarity.

Figure 11:
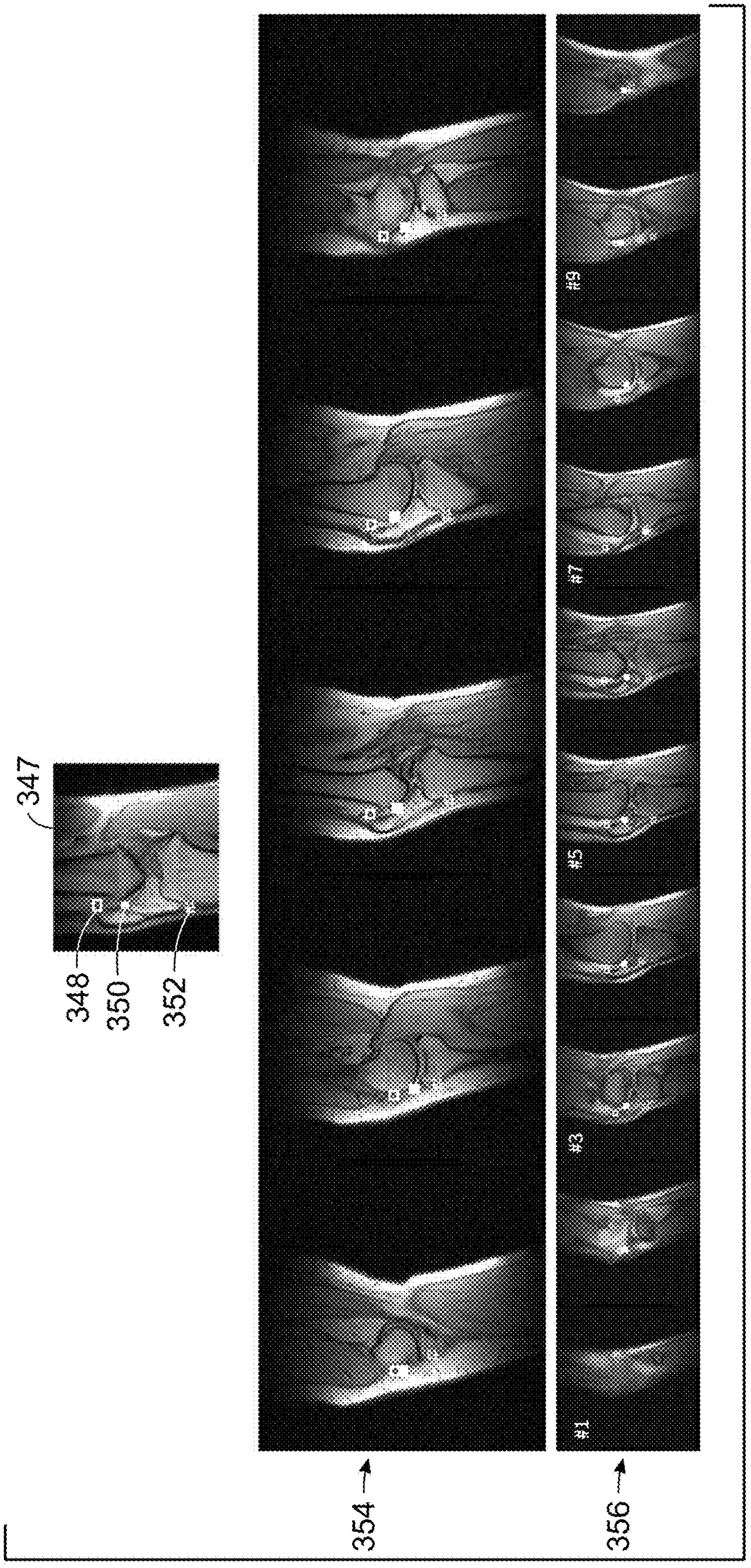
FIG. 11 illustrates the utilization of multi-label, single shot localization of entire knee volumes, in accordance with aspects of the present disclosure.

FIG. 11 illustrates the utilization of multi-label, single shot localization of entire knee volumes as described in the method 320 in FIG. 7. A template image 347 of a knee includes three different regions of interest within the template image selected and marked as indicate by reference numerals 348, 350, and 352. The template image 347 is an MR image. A top row 354 of MR images depicts the localization of the selected regions of interest in different slices of knee volumes. A bottom row 356 of MR images depicts a plurality slices of a knee imaging volume. While the method 320 in FIG. 7 is robust with regard to handling false positives in slices far away from the template image 347, this requires additional computation. As mentioned above, particular slices may be selected (i.e., determined to be the most relevant) utilizing image token matching. This restricts processing to the most relevant slices. In the bottom row 356, slices 4-6 would be the most relevant.

Technical effects of the disclosed subject matter include enabling performing localization and segmentation automatically using foundation models based on templates and a data driven feature selection approach. In addition, technical effects of the disclosed subject matter also include enabling the ability to perform multi-label segmentation in a single shot. Technical effects of the disclosed subject matter further include enabling multiple tasks to be accomplished with a single foundation model.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method, comprising:

obtaining, at a processor, a medical image of a portion of a subject;

receiving, at the processor, a selection of both a template image and regions of interest within the template image, wherein the region of interest is marked in the template image and is associated with a label;

inputting, via the processor, both the medical image and the template image into a trained vision transformer model;

outputting, via the processor, from the trained vision transformer model both pixel level feature vectors from the medical image and a reference pixel level feature vector from the region of interest of the template image;

inputting, via the processor, both the pixel level feature vectors and the reference pixel level feature vector into a trained contrastive similarity metric learning model, wherein the trained contrastive similarity metric learning model is configured to automatically determine which of the pixel level feature vectors are similar to the reference pixel level feature vector;

outputting, via the processor, from the trained contrastive similarity metric learning model, pixels that are similar to reference pixels;

labeling, via the processor, pixels in the medical image associated with the pixel level feature vectors that are similar to the reference pixel level feature vector with an initial segmentation mask, wherein the pixels that are labeled in the medical image correspond to the region of interest; and utilizing, via the processor, a promptable segmentation model to label the medical image with a refined segmentation mask of a region that corresponds to the region of interest, wherein the initial segmentation mask serves as an automatic prompt for labeling.

2. The computer-implemented method of claim 1, wherein labeling pixels in the medical image associated with the pixel level feature vectors that are similar to the reference pixel level feature vector comprises utilizing connected component analysis on the pixels to generate the initial segmentation mask.

3. The computer-implemented method of claim 1, further comprising:

obtaining, at a processor, a medical imaging volume of the portion of the subject, wherein the medical imaging volume comprises a plurality of medical images including the medical image;

inputting, via the processor, each medical image of the plurality of medical images into the trained vision transformer model;

outputting, via the processor, from the trained vision transformer model respective pixel level feature vectors from each medical image of the plurality of medical images;

inputting, via the processor, the respective pixel level feature vectors into the trained contrastive similarity metric learning model from each medical image of the plurality of medical images;

outputting, via the processor, from the trained contrastive similarity metric learning model respective pixels from each medical image of the plurality of medical images that are similar to reference pixels; and labeling, via the processor, the respective pixels in each medical image of the plurality of medical images associated with the respective pixel level feature vectors from each medical image of the plurality of medical images that are similar to the reference pixel level feature vector with a respective initial segmentation mask, wherein the respective pixels that are labeled in each medical image of the plurality of medical images correspond to the region of interest.

4. The computer-implemented method of claim 3, further comprising utilizing, via the processor, the promptable segmentation model to label each medical image of the plurality of medical images with a respective refined segmentation mask of a respective region that corresponds to the region of interest, wherein the respective initial segmentation mask serves as a respective automatic prompt for labeling.

5. The computer-implemented method of claim 1, further comprising:

obtaining, at a processor, a medical imaging volume of the portion of the subject, wherein the medical imaging volume comprises a plurality of medical images including the medical image;

inputting, via the processor, each medical image of the plurality of medical images into the trained vision transformer model;

outputting, via the processor, from the trained vision transformer model respective pixel level feature vectors and respective image level features from each medical image of the plurality of medical images;

determining, via the processor, a set of most relevant medical images from the plurality of medical images;

inputting, via the processor, the respective pixel level feature vectors into the trained contrastive similarity metric learning model from the set of most relevant medical images;

outputting, via the processor, from the trained contrastive similarity metric learning model respective pixels from the set of most relevant medical images that are similar to reference pixels; and labeling, via the processor, the respective pixels in each medical image of the set of most relevant medical images associated with the respective pixel level feature vectors from each medical image of the set of most relevant medical images that are similar to the reference pixel level feature vector with a respective initial segmentation mask, wherein the respective pixels that are labeled in each medical image of the set of most relevant medical images correspond to the region of interest.

6. The computer-implemented method of claim 5, further comprising utilizing, via the processor, the promptable segmentation model to label each medical image of the set of most relevant medical images with a respective refined segmentation mask of a respective region that corresponds to the region of interest, wherein the respective initial segmentation mask serves as a respective automatic prompt for labeling.

7. The computer-implemented method of claim 5, wherein determining the set of most relevant medical images from the plurality of medical images is based on the image level features.

8. The computer-implemented method of claim 1, further comprising:

receiving, at the processor, the selection of a plurality of regions of interest within the template image, wherein each region of interest of the plurality of regions of interest is respectively marked in the template image and is associated with a respective label;

outputting, via the processor, from the trained vision transformer model respective reference pixel level feature vectors from each region of interest of the plurality of regions of interest of the template image;

inputting, via the processor, each respective reference pixel level feature vector into the trained contrastive similarity metric learning model, wherein the trained contrastive similarity metric learning model is configured to automatically determine which of the pixel level feature vectors are similar to each respective reference pixel level feature vector for each region of interest;

outputting, via the processor, from the trained contrastive similarity metric learning model respective groups of pixels that are similar to each of respective reference pixels for each region of interest; and individually labeling, via the processor, the respective groups of pixels in the medical image associated with each group of the respective groups of pixel level feature vectors that are similar to each respective reference pixel level feature vector for each region of interest with a respective initial segmentation mask, wherein the respective groups of pixels that are individually labeled in the medical image correspond to respective regions of interest of the plurality of regions of interest.

9. The computer-implemented method of claim 8, further comprising utilizing, via the processor, the promptable segmentation model to label the medical image with respective refined segmentation masks of respective regions that respectively correspond to the respective regions of interest of the plurality of regions of interest, wherein the respective initial segmentation masks serve as automatic prompts for labeling.

10. A system, comprising:

a memory encoding processor-executable routines; and a processor configured to access the memory and to execute the processor-executable routines, wherein the processor-executable routines, when executed by the processor, cause the processor to:

obtain a medical image of a portion of a subject;

receive a selection of both a template image and a region of interest within the template image, wherein the region of interest is marked in the template image and is associated with a label;

input both the medical image and the template image into a trained vision transformer model;

output from the trained vision transformer model both pixel level feature vectors from the medical image and a reference pixel level feature vector from the region of interest of the template image;

input both the pixel level feature vectors and the reference pixel level feature vector into a trained contrastive similarity metric learning model, wherein the trained contrastive similarity metric learning model is configured to automatically determine which of the pixel level feature vectors are similar to the reference pixel level feature vector;

output from the trained contrastive similarity metric learning model pixels that are similar to reference pixels;

label the pixels in the medical image associated with the pixel level feature vectors that are similar to the reference pixel level feature vector with an initial segmentation mask, wherein the pixels that are labeled in the medical image correspond to the region of interest; and utilize a promptable segmentation model to label the medical image with a refined segmentation mask of a region that corresponds to the region of interest, wherein the initial segmentation mask serves as an automatic prompt for labeling.

11. The system of claim 10, wherein labeling pixels in the medical image associated with the pixel level feature vectors that are similar to the reference pixel level feature vector comprises utilizing connected component analysis on the pixels to generate the initial segmentation mask.

12. The system of claim 10, wherein the processor-executable routines, when executed by the processor, further cause the processor to:

obtain a medical imaging volume of the portion of the subject, wherein the medical imaging volume comprises a plurality of medical images including the medical image;

input each medical image of the plurality of medical images into the trained vision transformer model;

output from the trained vision transformer model respective pixel level feature vectors from each medical image of the plurality of medical images;

input the respective pixel level feature vectors into the trained contrastive similarity metric learning model from each medical image of the plurality of medical images;

output from the trained contrastive similarity metric learning model respective pixels from each medical image of the plurality of medical images that are similar to reference pixels; and label the respective pixels in each medical image of the plurality of medical images associated with the respective pixel level feature vectors from each medical image of the plurality of medical images that are similar to the reference pixel level feature vector with a respective initial segmentation mask, wherein the respective pixels that are labeled in each medical image of the plurality of medical images correspond to the region of interest.

13. The system of claim 12, wherein the processor-executable routines, when executed by the processor, further cause the processor to utilize the promptable segmentation model to label each medical image of the plurality of medical images with a respective refined segmentation mask of a respective region that corresponds to the region of interest, wherein the respective initial segmentation mask serves as a respective automatic prompt for labeling.

14. The system of claim 10, wherein the processor-executable routines, when executed by the processor, further cause the processor to:

obtain a medical imaging volume of the portion of the subject, wherein the medical imaging volume comprises a plurality of medical images including the medical image;

input each medical image of the plurality of medical images into the trained vision transformer model;

output from the trained vision transformer model respective pixel level feature vectors and respective image level features from each medical image of the plurality of medical images;

determine a set of most relevant medical images from the plurality of medical images;

input the respective pixel level feature vectors into the trained contrastive similarity metric learning model from the set of most relevant medical images;

output from the trained contrastive similarity metric learning model respective pixels from the set of most relevant medical images that are similar to reference pixels; and label the respective pixels in each medical image of the set of most relevant medical images associated with the respective pixel level feature vectors from each medical image of the set of most relevant medical images that are similar to the reference pixel level feature vector with a respective initial segmentation mask, wherein the respective pixels that are labeled in each medical image of the set of most relevant medical images correspond to the region of interest.

15. The system of claim 14, wherein the processor-executable routines, when executed by the processor, further cause the processor to utilize the promptable segmentation model to label each medical image of the set of most relevant medical images with a respective refined segmentation mask of a respective region that corresponds to the region of interest, wherein the respective initial segmentation mask serves as a respective automatic prompt for labeling.

16. The system of claim 10, wherein the processor-executable routines, when executed by the processor, further cause the processor to:

receive the selection of a plurality of regions of interest within the template image, wherein each region of interest of the plurality of regions of interest is respectively marked in the template image and is associated with a respective label;

output from the trained vision transformer model respective reference pixel level feature vectors from each region of interest of the plurality of regions of interest of the template image;

input each respective reference pixel level feature vector into the trained contrastive similarity metric learning model, wherein the trained contrastive similarity metric learning model is configured to automatically determine which of the pixel level feature vectors are similar to each respective reference pixel level feature vector for each region of interest;

output from the trained contrastive similarity metric learning model respective groups of pixels that are similar to each of respective reference pixels for each region of interest; and individually label the respective groups of pixels in the medical image associated with each group of the respective groups of pixel level feature vectors that are similar to each respective reference pixel level feature vector for each region of interest with a respective initial segmentation mask, wherein the respective groups of pixels that are individually labeled in the medical image correspond to respective regions of interest of the plurality of regions of interest.

17. The system of claim 16, wherein the processor-executable routines, when executed by the processor, further cause the processor to utilizing, via the processor, the promptable segmentation model to label the medical image with respective refined segmentation masks of respective regions that respectively correspond to the respective regions of interest of the plurality of regions of interest, wherein the respective initial segmentation masks serve as automatic prompts for labeling.

18. A non-transitory computer-readable medium, the computer-readable medium comprising processor-executable code that when executed by a processor, causes the processor to:

obtain a medical image of a portion of a subject;

receive a selection of both a template image and a plurality of regions of interest within the template image, wherein each region of interest of the plurality of regions of interest is respectively marked in the template image and is associated with a respective label;

input both the medical image and the template image into a trained vision transformer model;

output from the trained vision transformer model both respective pixel level feature vectors from the medical image and respective reference pixel level feature vectors from each region of interest of the plurality of regions of interest of the template image;

input both the pixel level feature vectors and the respective reference pixel level feature vector into a trained contrastive similarity metric learning model, wherein the trained contrastive similarity metric learning model is configured to automatically determine which of the pixel level feature vectors are similar to each respective reference pixel level feature vector for each region of interest;

output from the trained contrastive similarity metric learning model respective groups of pixels that are similar to each of respective reference pixels for each region of interest;

individually label the respective groups of pixels in the medical image associated with each group of the respective groups of pixel level feature vectors that are similar to each respective reference pixel level feature vector for each region of interest with a respective initial segmentation mask, wherein the respective groups of pixels that are individually labeled in the medical image correspond to respective regions of interest of the plurality of regions of interest; and utilizing a promptable segmentation model to label the medical image with respective refined segmentation masks of respective regions that respectively correspond to the respective regions of interest of the plurality of regions of interest, wherein the respective initial segmentation masks serve as automatic prompts for labeling.

* * * * *